(12) United States Patent
Bain

(10) Patent No.: US 7,406,564 B1
(45) Date of Patent: Jul. 29, 2008

(54) DISTRIBUTED FIFO

(75) Inventor: Peter Bain, Ottawa (CA)

(73) Assignee: Altera Corporation, San Jose, CA (US)

( * ) Notice: Subject to any disclaimer, the term of this patent is extended or adjusted under 35 U.S.C. 154(b) by 270 days.

(21) Appl. No.: 11/211,038

(22) Filed: Aug. 23, 2005

(51) Int. Cl.
*G06F 12/00* (2006.01)

(52) U.S. Cl. .......................... 711/118; 711/5; 711/100; 711/149; 711/151; 711/158; 711/173; 365/211; 365/230.03; 326/40

(58) Field of Classification Search ................. 711/118, 711/5, 100, 149, 151, 158, 173; 365/230.03, 365/221; 326/40
See application file for complete search history.

(56) References Cited

U.S. PATENT DOCUMENTS

| | | | | |
|---|---|---|---|---|
| 4,942,553 A | * | 7/1990 | Dalrymple et al. ............. 710/57 |
| 5,235,595 A | * | 8/1993 | O'Dowd ..................... 370/392 |
| 5,506,747 A | * | 4/1996 | Bain ...................... 365/230.03 |
| 6,819,651 B2 | * | 11/2004 | Hojo et al. ................... 370/222 |
| 7,038,952 B1 | * | 5/2006 | Zack et al. ............. 365/189.01 |
| 7,106,098 B1 | * | 9/2006 | Zack et al. ..................... 326/40 |
| 7,161,849 B1 | * | 1/2007 | Lowe et al. ............ 365/189.05 |
| 7,254,677 B1 | * | 8/2007 | Lowe et al. .................. 711/118 |

* cited by examiner

*Primary Examiner*—Stephen C Elmore
(74) *Attorney, Agent, or Firm*—Townsend and Townsend and Crew LLP; J. Matthew Zigmant

(57) ABSTRACT

Circuits, methods, and apparatus for FIFO memories made up of multiple local memory arrays. These embodiments limit the number and length of interconnect lines that are necessary to join two or more local memory arrays into a single, larger functional unit. One exemplary embodiment of the present invention provides a FIFO made up of a number of FIFO sub-blocks connected in series. Each FIFO sub-block includes local read and write address counters such that read and write addresses are not bused between the FIFO sub-blocks.

20 Claims, 16 Drawing Sheets

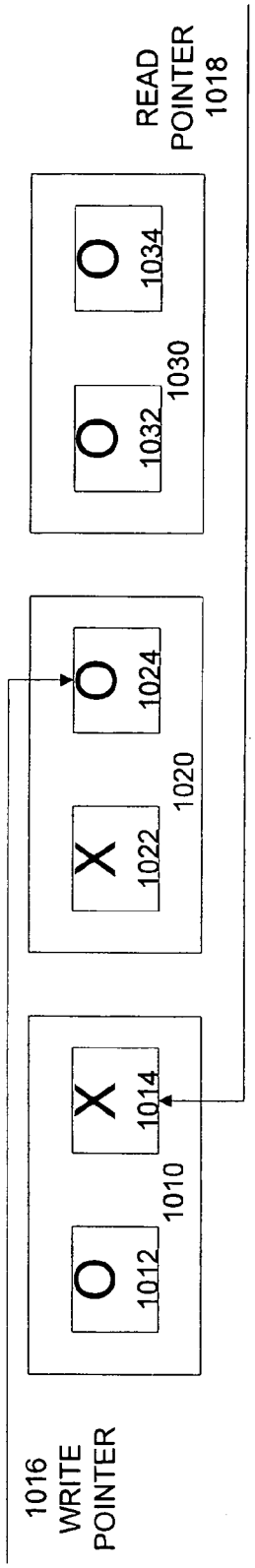
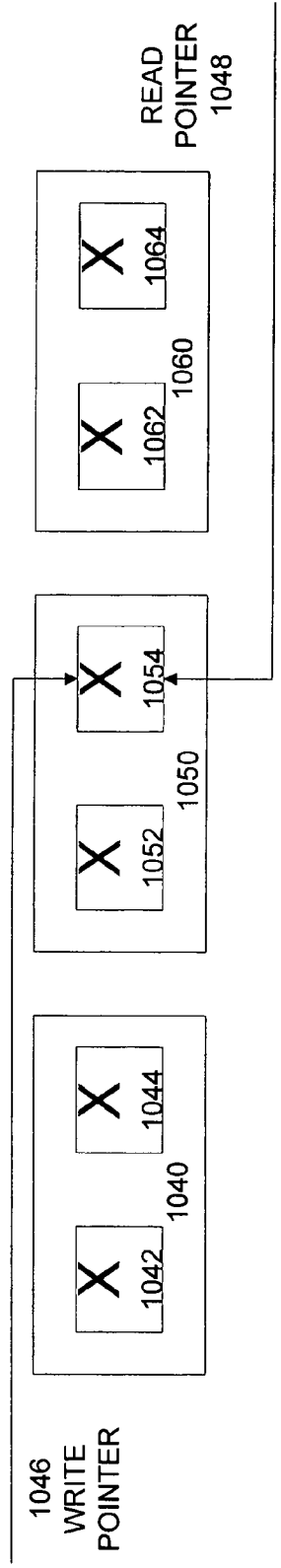
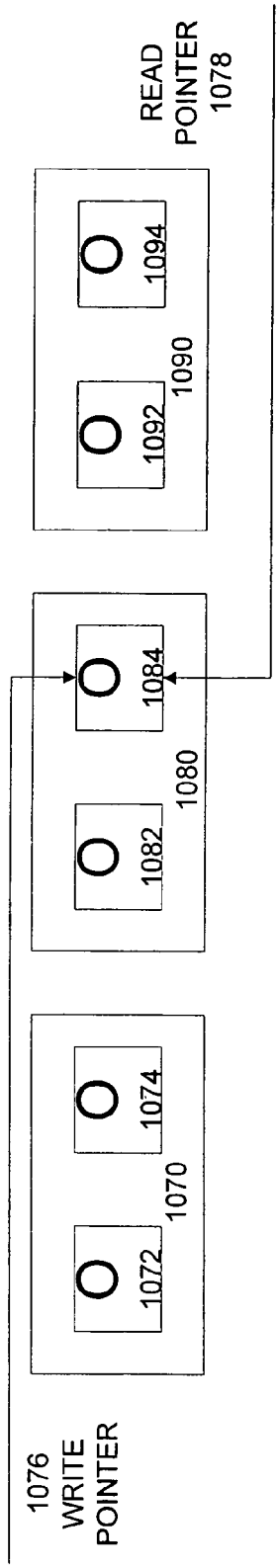

US 7,406,564 B1

DISTRIBUTED FIFO

BACKGROUND

The present invention relates to first-in-first-out memories (FIFOs) for integrated circuits, and more particularly to distributed FIFOs for field programmable gate arrays (FPGAs).

The size, complexity, and functionality of field programmable gate array integrated circuits have been increasing at a tremendous rate the last several years. FPGA devices now include thousands of configurable or programmable cells such as configurable logic gates and I/O cells, programmable interconnect, memories, and other types of circuits. These circuits are often intermixed on an integrated circuit, such that various logic blocks have routing access to memories, I/O cells, and other included circuitry.

The optimal size and distribution of memories on an FPGA or other configurable device has been the subject of much study and analysis. Typically, it is desirable to have several small local memory arrays distributed about on an FPGA integrated circuit. When a circuit formed from configurable logic needs to use memory resources, this arrangement allows easy access. In particular, having a small local memory nearby reduces the length of interconnect lines to the memory, which saves valuable routing resources and reduces stray capacitance, thereby saving power and reducing gate delay times.

But on occasion it is desirable to have a larger memory. For example, a circuit function may require a FIFO that is larger than a particular local memory array. In this case, two or more local memory arrays can be combined into a single functional unit.

When this occurs, the length of the interconnect lines used to reach the more distant memory arrays become long. The problems that were sought to be remedied by the use of smaller local memories return. That is, longer interconnect lines, which consume routing resources that could be better spent and result in larger stray capacitances that slow circuit signal paths, are needed.

Thus, it is desirable to have improved FIFO architectures that are formed from several smaller memory arrays in such a way as to reduce the number and length of interconnect lines. It is further desirable to reduce the number and length of necessary interconnect lines without dramatically increasing the complexity of circuitry included in the FIFO.

SUMMARY

Accordingly, embodiments of the present invention provide circuits, methods, and apparatus for FIFO memories made up of multiple distributed memory arrays. These embodiments limit the number and length of interconnect lines that are necessary to join two or more local memory arrays into a single, larger functional unit. One exemplary embodiment of the present invention provides a FIFO made up of a number of FIFO sub-blocks connected in series. Each FIFO sub-block includes local read and write address counters such that read and write addresses do not need to be bused between the smaller FIFO sub-blocks.

In one exemplary embodiment of the present invention, data is written to a FIFO by providing a write signal and data to a first FIFO sub-block. Once data has been written to every location in the first FIFO sub-block, the write signal and data is passed from the first sub-block to a second sub-block. Similarly, once each location has been written to, the write signal and data are passed on to the next FIFO sub-block. When the last FIFO sub-block in the chain or series has been written to, the data is written to the first sub-block once again. Each sub-block maintains its own write address counter such that address lines do not need to be sent between FIFO sub-blocks. Data may be retimed between sub-blocks, and a check is done to ensure that the FIFO is not full before data is written.

In this exemplary embodiment of the present invention, data is read from the FIFO by providing a read signal to the last FIFO sub-block. This request is passed back through the chain to the first FIFO sub-block. Once each location in the first FIFO sub-block has been read, following read requests access locations in the second FIFO sub-block. This process continues until the final FIFO sub-block is reached. Once each location in the final FIFO sub-block has been read, the next request is passed once again to the first FIFO sub-block. Again, each sub-block maintains its own read address counter such that address lines do not need to be sent between FIFO sub-blocks. Data may be retimed between sub-blocks, and a check is done that the FIFO is not empty before data is read. Also, data may be prefetched in the remote FIFO sub-blocks to maintain fast read access times. Various embodiments of the present invention may incorporate one or more of these or the other features described herein.

A better understanding of the nature and advantages of the present invention may be gained with reference to the following detailed description and the accompanying drawings.

BRIEF DESCRIPTION OF THE DRAWINGS

FIGS. 10A-C illustrate normal, empty, and full states for a distributed FIFO according to an embodiment of the present invention.

DESCRIPTION OF EXEMPLARY EMBODIMENTS

Figure 1:
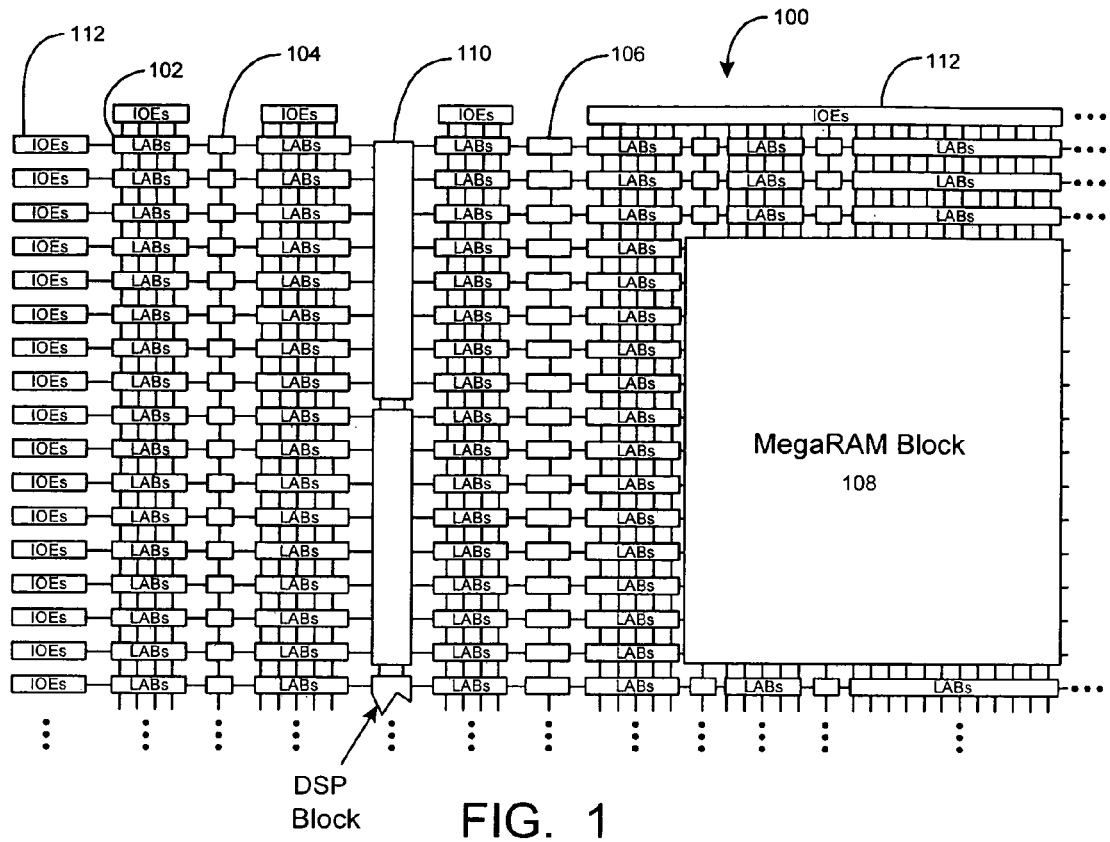
FIG. 1 is a simplified block diagram of a programmable logic device that is improved by incorporating embodiments of the present invention.

FIG. 1 is a simplified partial block diagram of an exemplary high-density programmable logic device 100 wherein techniques according to the present invention can be utilized. PLD 100 includes a two-dimensional array of programmable logic array blocks (or LABs) 102 that are interconnected by a network of column and row interconnections of varying length and speed. LABs 102 include multiple (e.g., 10) logic elements (or LEs), an LE being a small unit of logic that provides for efficient implementation of user defined logic functions.

PLD 100 also includes a distributed memory structure including RAM blocks of varying sizes provided throughout the array. The RAM blocks include, for example, 512 bit blocks 104, 4K blocks 106, and an M-Block 108 providing 512K bits of RAM. These memory blocks may also include shift registers and FIFO buffers. PLD 100 further includes digital signal processing (DSP) blocks 110 that can implement, for example, multipliers with add or subtract features.

It is to be understood that PLD 100 is described herein for illustrative purposes only and that the present invention can be implemented in many different types of PLDs, FPGAs, and the other types of digital integrated circuits.

Figure 2:
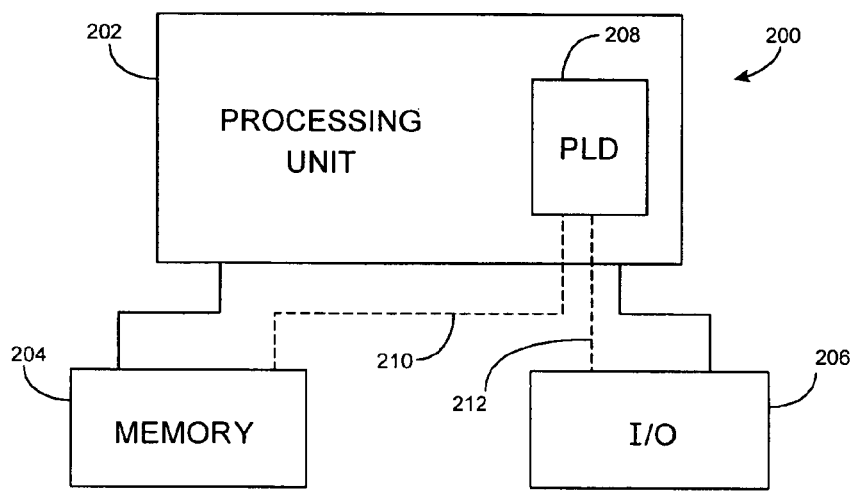
FIG. 2 is a block diagram of an electronic system that is improved by incorporating embodiments of the present invention.

While PLDs of the type shown in FIG. 1 provide many of the resources required to implement system level solutions, the present invention can also benefit systems wherein a PLD is one of several components. FIG. 2 shows a block diagram of an exemplary digital system 200, within which the present invention may be embodied. System 200 can be a programmed digital computer system, digital signal processing system, specialized digital switching network, or other processing system. Moreover, such systems may be designed for a wide variety of applications such as telecommunications systems, automotive systems, control systems, consumer electronics, personal computers, Internet communications and networking, and others. Further, system 200 may be provided on a single board, on multiple boards, or within multiple enclosures.

System 200 includes a processing unit 202, a memory unit 204 and an I/O unit 206 interconnected together by one or more buses. According to this exemplary embodiment, a programmable logic device (PLD) 208 is embedded in processing unit 202. PLD 208 may serve many different purposes within the system in FIG. 2. PLD 208 can, for example, be a logical building block of processing unit 202, supporting its internal and external operations. PLD 208 is programmed to implement the logical functions necessary to carry on its particular role in system operation. PLD 208 may be specially coupled to memory 204 through connection 210 and to I/O unit 206 through connection 212.

Processing unit 202 may direct data to an appropriate system component for processing or storage, execute a program stored in memory 204 or receive and transmit data via I/O unit 206, or other similar function. Processing unit 202 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLD 208 can control the logical operations of the system. In an embodiment, PLD 208 acts as a reconfigurable processor, which can be reprogrammed as needed to handle a particular computing task. Alternately, programmable logic device 208 may itself include an embedded microprocessor. Memory unit 204 may be a random access memory (RAM), read only memory (ROM), fixed or flexible disk media, PC Card flash disk memory, tape, or any other storage means, or any combination of these storage means.

Figure 3:
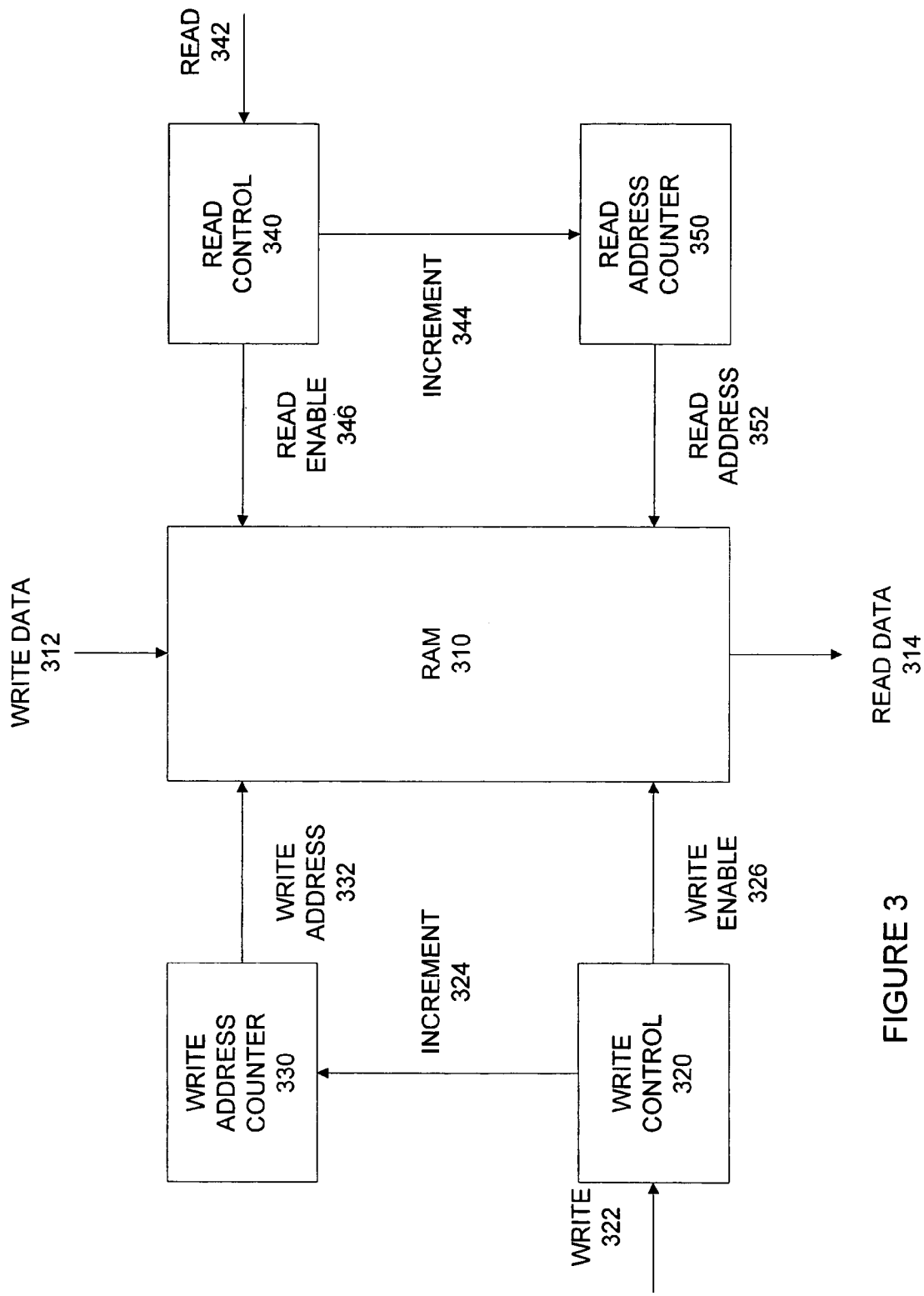
FIG. 3 is a block diagram of a FIFO that is improved by incorporating embodiments of the present invention.

FIG. 3 is a block diagram of a FIFO that may be improved by incorporating embodiments of the present invention. This block diagram includes a memory array 310, write control circuit 320, write address counter 330, read control circuit 340, and read address counter 350. This and the other included figures are shown for illustrative purposes only, and do not limit either the possible embodiments of the present invention or the claims.

A write signal is provided to the write control circuit 320 on line 322, while a read signal is provided to the read control circuit 340 on line 342. Write data is received by the memory array 310 on lines 312, and read data is provided on lines 314.

When data is to be written to the memory array 310, a write signal is asserted on line 332. A write enable signal is provided on line 326 by the write control circuit 320 to the memory array 310, and data is provided on line 312. A write address is provided on line 332 by the write address counter 330. Between writes, the write control circuit 320 provides an increment signal on line 324 to the write address counter 330, which increments the address.

During a read cycle, a read signal as asserted on line 342, and a read enable signal is provided on line 346 to the memory array 310 by the read control circuit 340, while read data is provided on line 314. A read address is provided on line 352 by the read address counter 350. Between read cycles, the read control circuit 340 provides an increment signal on line 344 to the read address counter 350, which in turn increments the read address counter 350.

If the memory array 310 is a single local memory array in a reconfigurable device, the surrounding counters and control circuitry are typically sufficient to form a FIFO with acceptable performance. However, if a larger FIFO is required, more local memory arrays are needed. A conventional solution to forming a larger FIFO from multiple local memory arrays is shown in the following figure.

Figure 4:
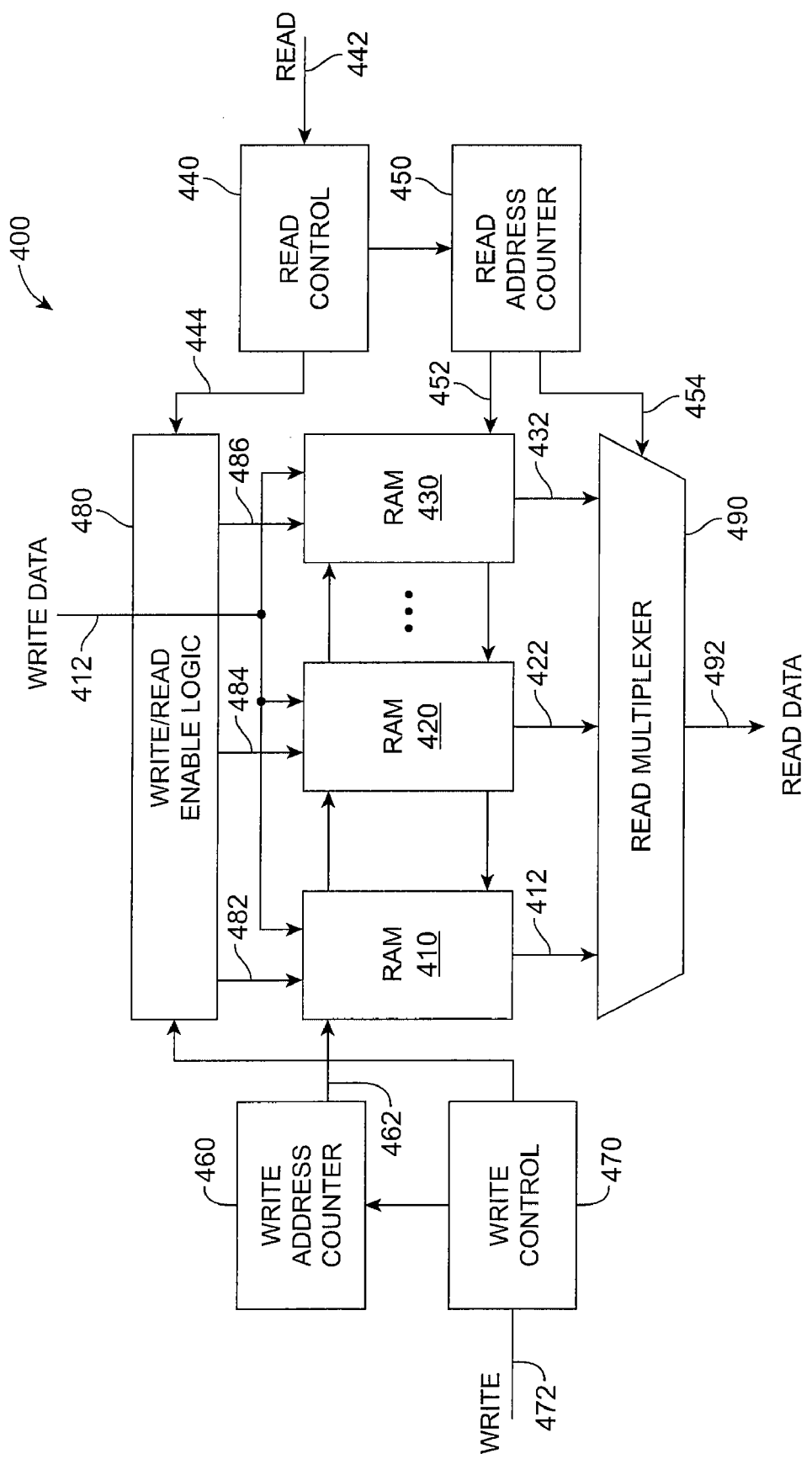
FIG. 4 is another block diagram of a FIFO that is improved by incorporating embodiments of the present invention.

FIG. 4 is another block diagram of a FIFO that may be improved by incorporating embodiments of the present invention. This block diagram of includes a number of local memory arrays 410, 420, and 430, a read control circuit 440, read address counter 450, write address counter 460, write control circuit 470, read write enable logic circuit 480, and a read multiplexer 490.

When data is to be written to this FIFO, a write signal is asserted on line 472 and provided to the write control circuit 470. The write control circuit in turn provides an enable signal which selects one of the RAMs or local memory arrays 410, 420, or 430. The write address counter 460 provides address information to the local memory arrays 410,420, and 430.

Similarly, when a read occurs, a read signal is asserted on line 442 and received by the read control circuitry 440. The read control circuitry 440 provides an enable signal to the read write enable logic 480. The read address counter 450 provides address information on lines 452 to the local memory arrays 410, 420, and 430. The data outputs of the local memory arrays 410, 420, and 430 are multiplexed by read multiplexer 490, which in turn provides a read data output on line 492.

Again, the local memory arrays 410, 420, and 430 are typically some distance apart on an integrated circuit. For example, they may be some distance apart on a configurable device such as a field programmable gate array. The write address counter 460 provides an address on lines 462 to the local memory arrays 410, 420, and 430. These address lines must therefore traverse the expanse between the memory arrays 410, 420, and 430. These long lines consume valuable programmable interconnect resources, and add capacitance to the address lines 462, thus slowing FIFO performance.

Similarly, the read address counter provides address information on lines 452 to the local memory arrays 410, 420, and 430. These lines similarly traverse the distance between these local memory arrays, and also consume route paths and add capacitances that slow circuit speed and degrade performance.

Figure 5:
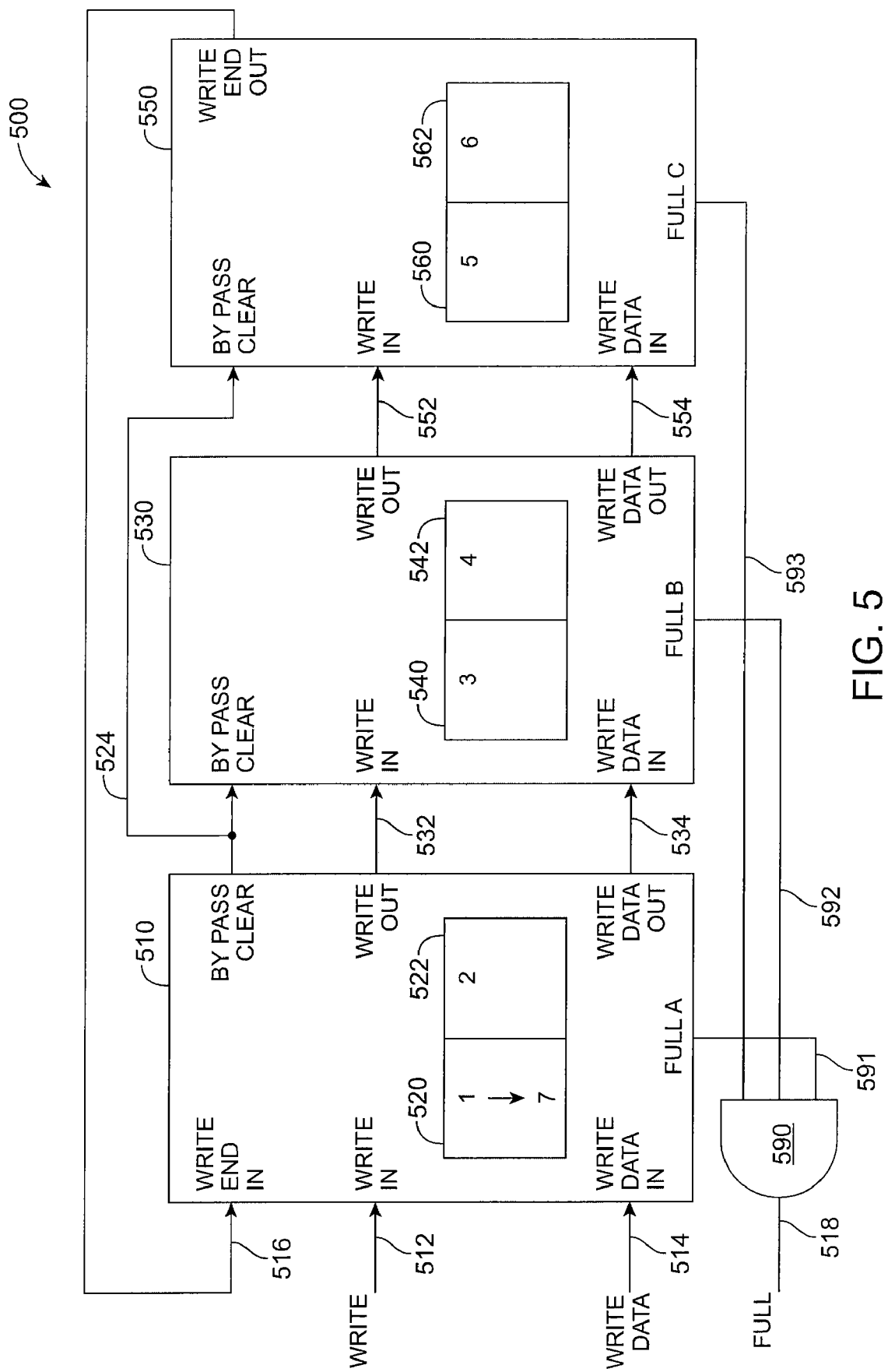
FIG. 5 illustrates a write path of a distributed FIFO according to an embodiment of the present invention.

FIG. 5 illustrates the write path of a distributed FIFO 500 according to an embodiment of the present invention. FIFO 500 includes a first local memory array and associated circuitry 510, a second local memory array and associated circuitry 530, and a third local memory array and associated circuitry 550. Each memory array and associated circuitry may be grouped together in different locations on a configurable integrated circuit, where each location is a distance apart from each other. While this figure includes three local memory arrays and associated circuits, embodiments of the present invention may include two, four, or more than four local memory arrays and associated circuitry. These local memory arrays and associated circuitry may be referred to as FIFO sub-blocks.

When data is to be written into the FIFO 500, a write signal is asserted on line 512 and write data is provided on lines 514 to the first FIFO sub-block 510. The data is stored in the first memory location 520. The second data is written to the second location 522 in the first memory FIFO sub-block 510. For simplicity, each FIFO sub-block is shown as having two memory locations, though typically a FIFO sub-block has many more than two memory locations.

If data has been written to each of the memory locations in the first FIFO sub-block 510, the next write signal on line 512 is passed on line 532 to the second FIFO sub-block 530. Similarly, the write data on lines 514 is passed on lines 534 to the second FIFO sub-block 530. Data is then written to the second FIFO sub-block, first to the third memory location 540, then to the fourth memory location 542.

When the data has been written to each of the memory locations in the second FIFO sub-block 530, the following write signal that is asserted on line 512 is passed on line 552 to the third FIFO sub-block 550. Similarly, the write data on lines 514 is passed on lines 554 to the third FIFO sub-block 550. Data is first written to the fifth memory location 560, then to the sixth memory location 562. When nearly each of the memory locations in the third FIFO sub-block 550 have been written to, the write-end signal on line 516 is asserted and received by the first FIFO sub-block 510. The timing of this signal is discussed further below, but in short, the write-end signal is a flag indicating that the far end of the distributed FIFO has nearly been reached, and it is almost time to start writing to the front of the FIFO again.

Once each of the memory locations in FIFO sub-block 510 have been written to, the following write cycle writes data to the first memory location 520 in the first FIFO sub-block 510. If data in the first memory location 520 in the first FIFO sub-block 510 has not yet been read, a flag instructing the writing circuitry that the FIFO is full and cannot be written to is asserted. More generally, full signals from each of the FIFO sub-blocks are combined to generate a full signal for the entire FIFO. In this specific example, local full signals on lines 591, 592, and 593 are combined by logic gate 590 to generate a full signal on line 518.

With this architecture, the address lines are not routed between the FIFO sub-blocks 510, 530, and 550. Similarly, the number and routing of enable signals is reduced, and other signal paths are simplified.

Figure 6A:
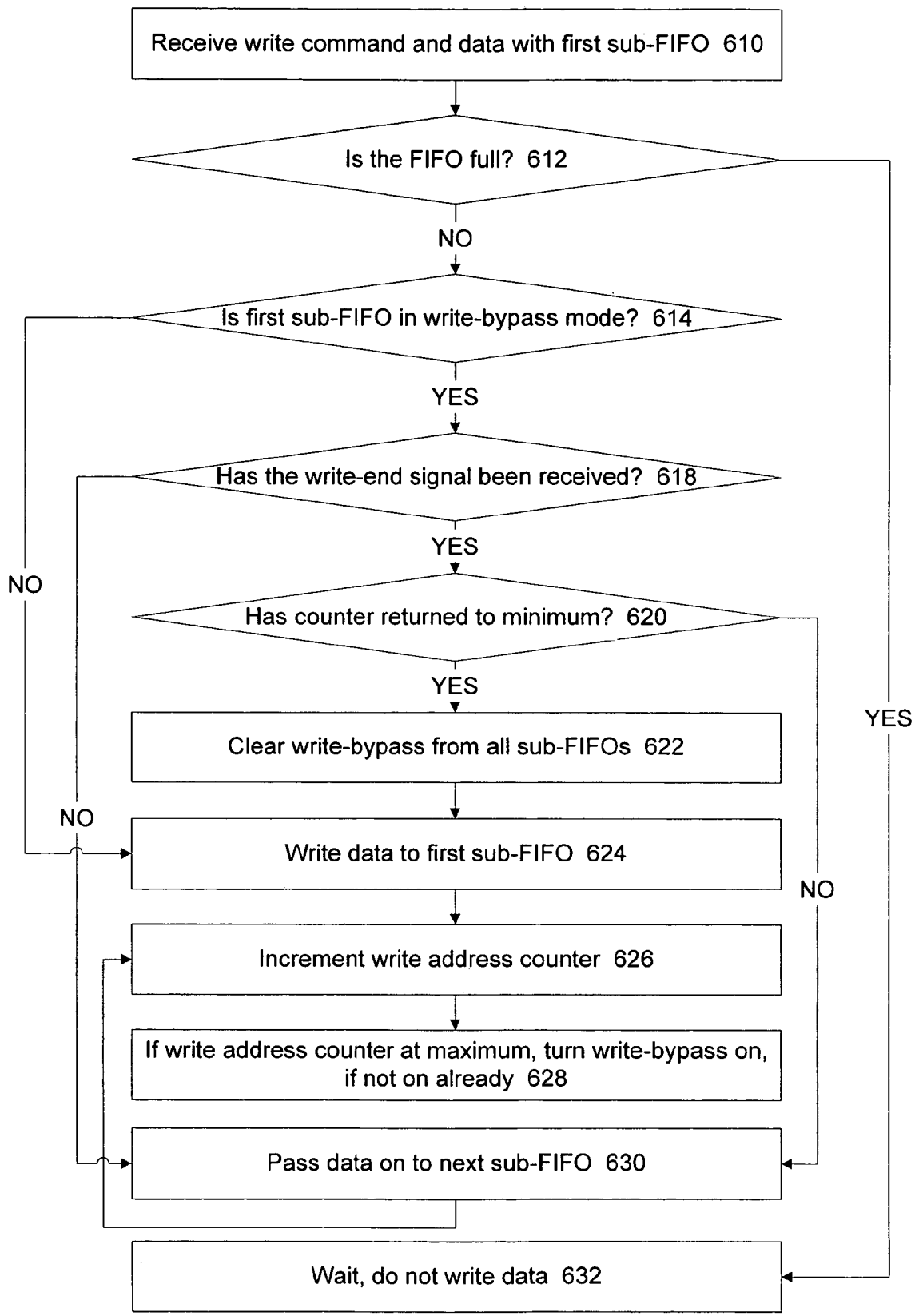
FIGS. 6A-C are flowcharts illustrating the operation of a write path for a first, middle, and last sub-block of a distributed FIFO according to an embodiment of the present invention.
Figure 6B:
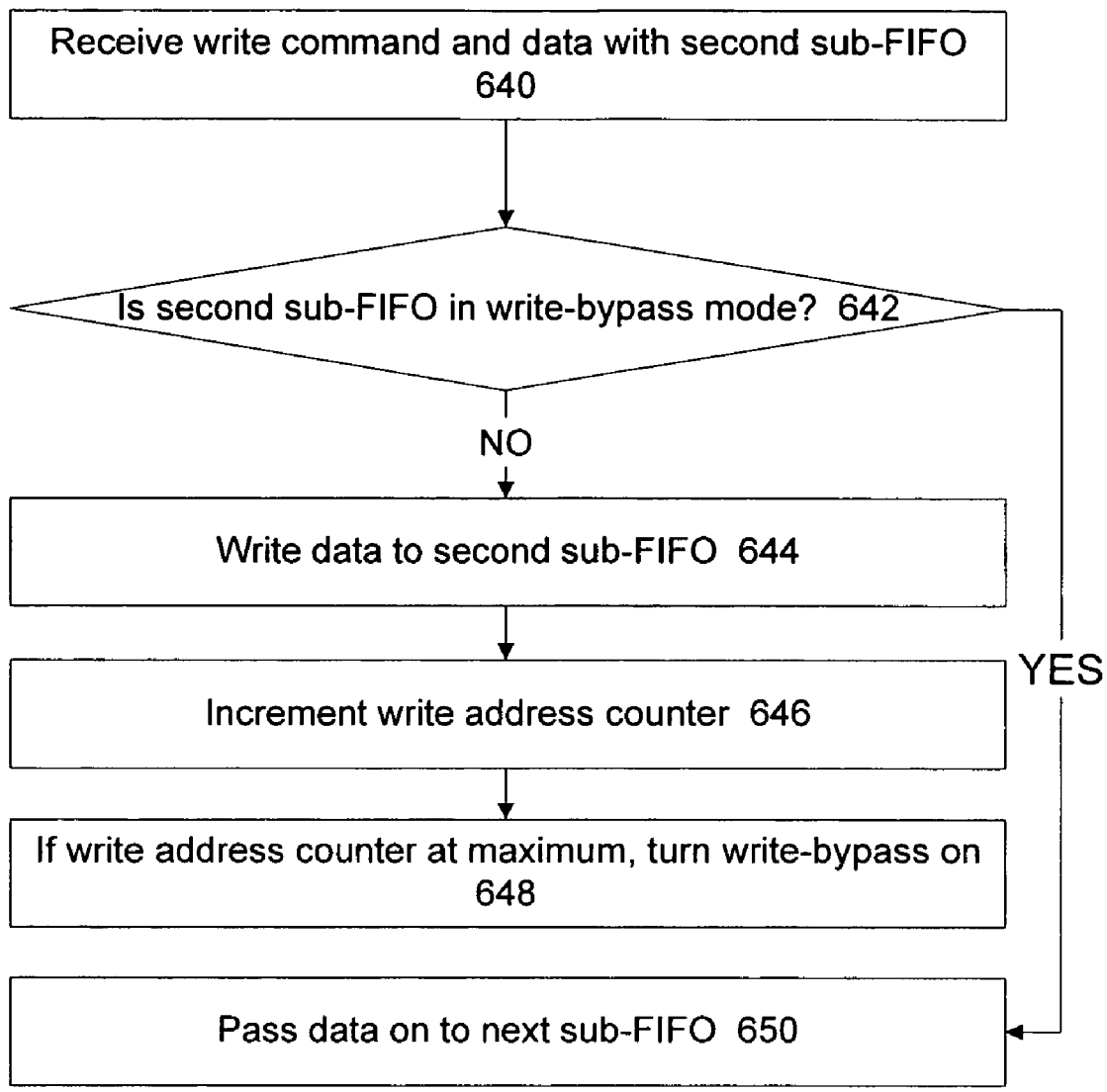
Figure 6C:
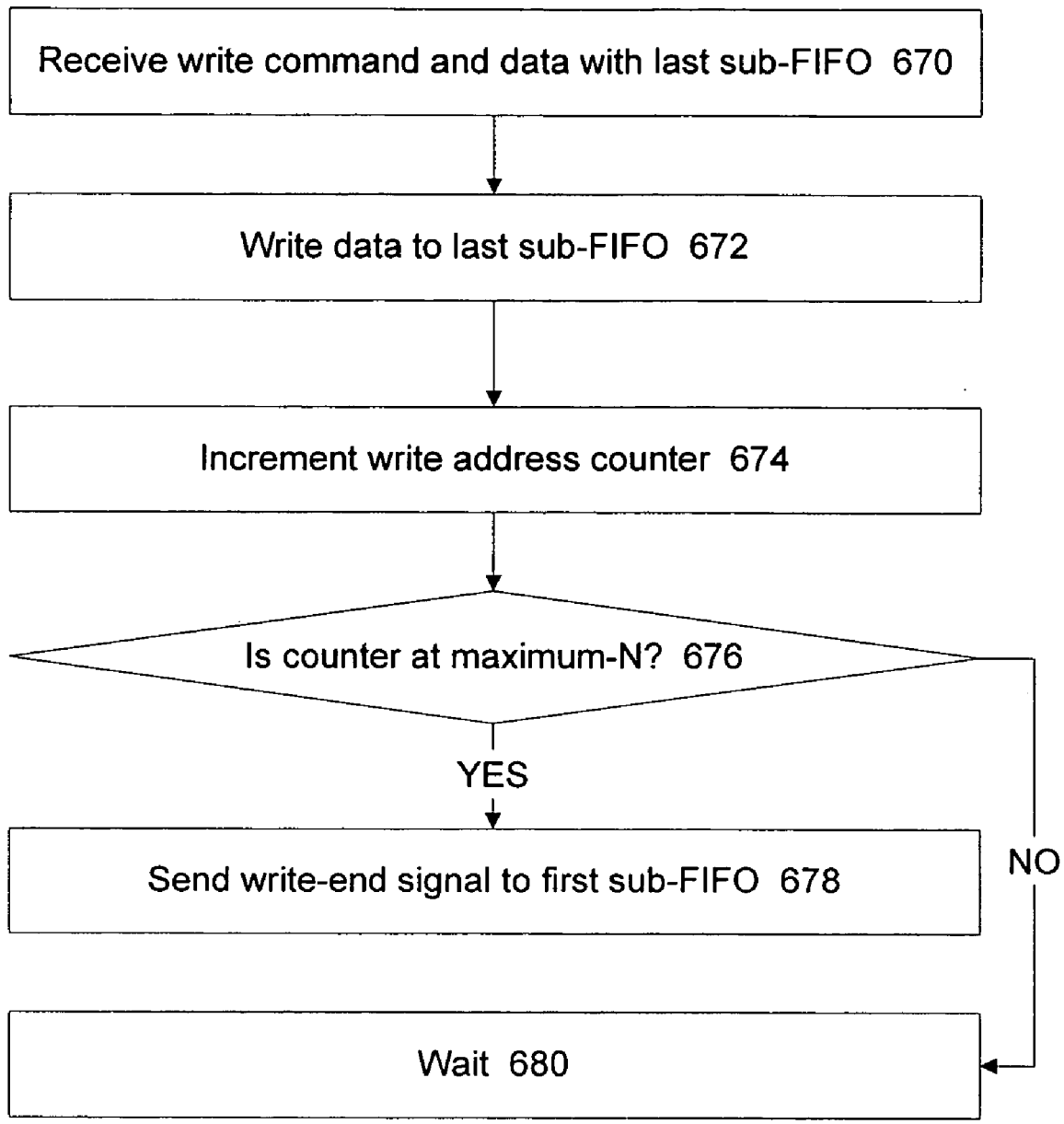

FIGS. 6A-C are flowcharts illustrating the operation of a write path for a first, middle, and last sub-block of a distributed FIFO according to an embodiment of the present invention. FIG. 6A is a flow chart showing the operation of a write path for a first sub-block of a distributed FIFO according to an embodiment of the present invention. In act 610, a write command and data are received by the first FIFO sub-block. In a typical embodiment, it is desirable that data in the FIFO not be overwritten before it is read. Accordingly, in act 612, it is determined whether the FIFO is full, that is whether every FIFO entry has been written to and not read. If the FIFO is full, the data is not written, as shown in act 632.

If the FIFO is not full, it is determined whether the next memory address to be written to is in the first FIFO sub-block or a later FIFO sub-block, that is, whether the first FIFO sub-block is in the write bypass mode. If the first FIFO sub-block is not in the write bypass mode, the data is written to the first FIFO sub-block in act 624.

After the last location in the final FIFO sub-block has been written to, the last FIFO sub-block needs to inform the first FIFO sub-block that the next data write should be done by the first FIFO sub-block. This prevents data from being passed to the last FIFO sub-block after the final location in the last FIFO sub-block has been written to. But there is a lag-time from when the final location in the last FIFO sub-block is written to, to when this information is received and acted on by the first FIFO sub-block. Accordingly, in this specific embodiment, the last FIFO sub-block informs the first FIFO sub-block that it is nearing its end when it writes to a location that is some number of locations ahead of the final memory location. In a specific embodiment, it does this by asserting a write-end signal. A counter in the first FIFO sub-block continues counting each write cycle, when the counter is at a maximum count and the write-end signal is asserted the first FIFO sub-clock knows it is responsible for writing the next write data.

In this way, the counter in the first FIFO sub-block does not need to be large enough to count each write to the FIFO, and in fact it does not even need to know the size of the entire FIFO. Rather it needs only be large enough to count the writes to each particular FIFO sub-block. Further, the design of the first FIFO sub-block is not dependent on the size of the FIFO being implemented; only one first FIFO sub-block design is needed for any size FIFO being implemented. For example, in a FIFO with eight memory locations in four FIFO sub-blocks, the counter need only to be able to count to eight. When the count of eight is reached, and the write-end signal is asserted, the first FIFO sub-block knows that the next write is to the first location in the first FIFO sub-block.

In other embodiments, the counter in the first FIFO sub-block can count each write command received by the FIFO. In the above example, when the count of 32 is reached, the first FIFO sub-block knows that the next write is to the first location in the first FIFO sub-block. This implementation increases the size of the first counter and makes its design dependent on the size of the FIFO, but does eliminate the need for a write-end signal. It will be appreciated by one skilled in the art that other design choices may be made for this counter. Consideration should also be given to the design requirements of the full and empty detection circuits as discussed below. For example, the use of a counter in the first FIFO sub-block that counts every write may simplify the design of the full and empty circuits.

Returning to FIG. 6A, if the first FIFO sub-block is in the write bypass mode, as discussed above, it needs to be determined whether there remain memory locations for the data to be written to. Again, it is undesirable to pass a data write command and data to the last FIFO sub-block, if the end of the last FIFO sub-block has been reached. Accordingly, in act 618, it is determined whether the write-end signal has been received. If it has not, the data may be passed to the next FIFO sub-block in act 630. If the write-end signal has been received, it is determined in act 620 whether the counter has returned to a minimum value, or reached a maximum value depending on the exact circuit implementation. If the counter has not reached this value; the write data may be passed to the next FIFO sub-block in act 630. If the counter has reached its final count, the write bypass is cleared from all FIFO sub-blocks in act 622, and data is written to the first FIFO sub-block in act 624. After data has been written, the write address counter is incremented in act 626. Once the write address counter reaches a maximum, the write bypass state is entered in act 628, and the next write is passed to the next FIFO sub-block.

FIG. 6B is a flow chart showing the operation of a write path for a middle sub-block of a distributed FIFO according to an embodiment of the present invention. A middle FIFO sub-block is a sub-block that is neither the first nor the last sub-block. A distributed FIFO according to the present invention may have zero, one, two, or more middle sub-blocks. A write command and corresponding data is received by the second or middle FIFO sub-block in act 640. In act 642, it is determined whether the second FIFO sub-block is in the write bypass mode. If it is, data is passed to the next FIFO sub-block in act 650. If not, data may be written to the second or middle FIFO sub-block in act 644. In act 646, the write address counter is incremented. If the write address counter in this second or middle FIFO sub-block reaches its maximum, the write bypass state is entered in act 648.

FIG. 6C is a flow chart showing the operation of a write path for a final or last sub-block of a distributed FIFO according to an embodiment of the present invention. In act 670, a write command and data are received by the last FIFO sub-block. Data is written to the last FIFO sub-block in act 672. In act 674, the write address counter in the last FIFO sub-block is incremented. In act 676, it is determined whether the counter is at its maximum count less some number "N." If it is, the write-end signal is sent to the first FIFO sub-block in act 678. Again, "N" is chosen such that the write-end signal is received by the first FIFO sub-block in time to prevent the first FIFO sub-block from passing more write commands and data to the last FIFO sub-block than the last FIFO sub-block has the capacity to handle. If the counter has not reached its maximum count less the number "N," the FIFO sub-block waits in act 680.

Figure 7:
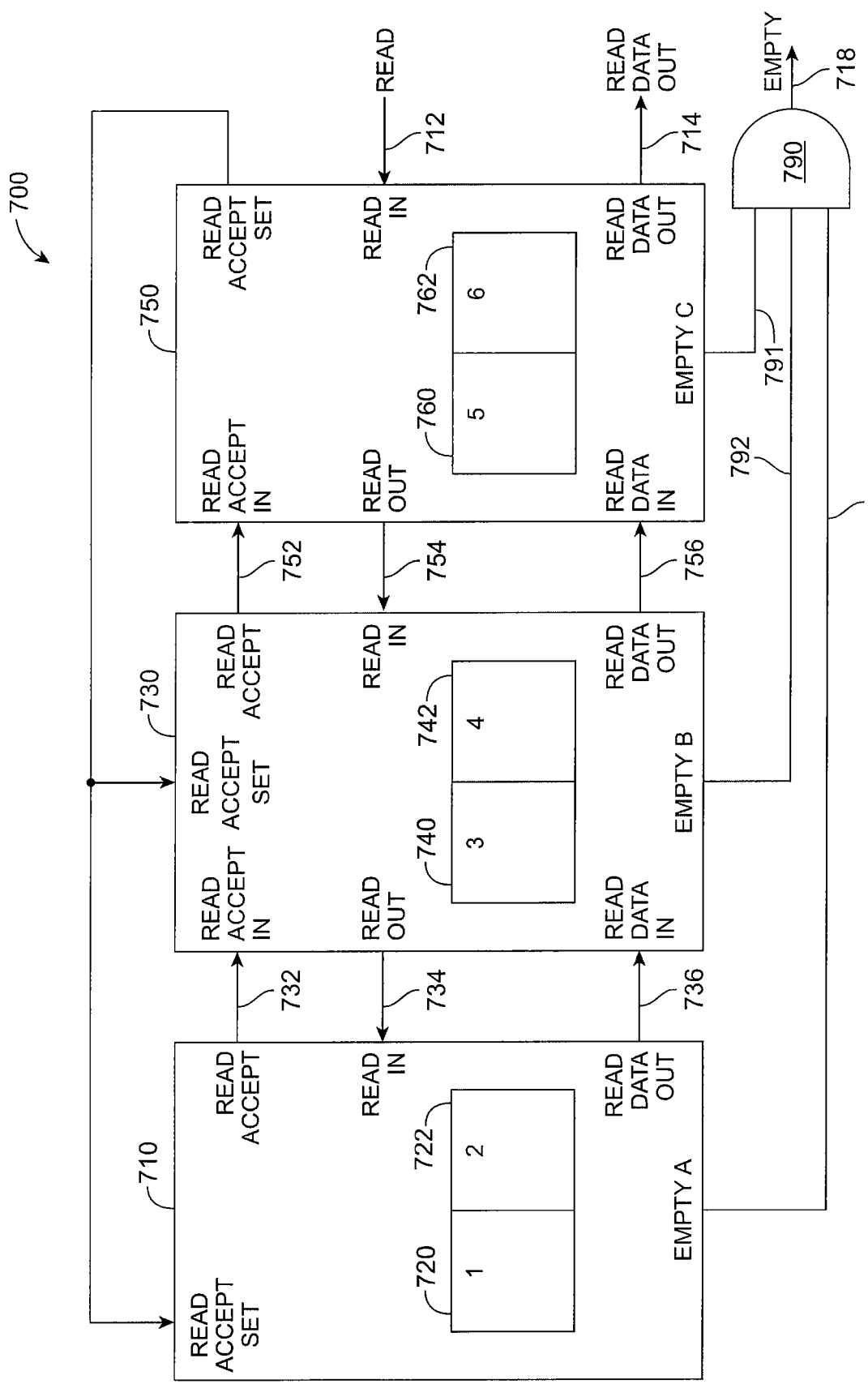
FIG. 7 illustrates a read path of a distributed FIFO according to an embodiment of the present invention.

FIG. 7 illustrates the read path of a distributed FIFO 700 according to an embodiment of the present invention. FIFO 700 includes a first local memory array and associated circuitry (FIFO sub-block, or sub-FIFO) 710, a second local memory array and associated circuitry 730, and a third local memory array and associated circuitry 750. As before, each memory array and associated circuitry may be grouped together in different locations on a configurable integrated circuit, where each location is located a distance apart from each other. Again, while this figure includes three local memory arrays and associated circuits, embodiments of the present invention may include two, four, or more than four FIFO sub-blocks.

Once all the data in a particular FIFO sub-block has been read, a flag is asserted at that FIFO sub-block's read-accept output. Accordingly, when the read signal on line 712 is asserted, the last FIFO sub-block 750 determines whether all the data locations in the second FIFO sub-block 730 have been read by checking the status of read-accept signal from the second FIFO sub-block on line 752. If they have not, the read signal is passed on line 754 to the second FIFO sub-block 730. However, if the read-accept signal from the second FIFO sub-block 730 is deasserted, data is read from the third FIFO sub-block 750.

Similarly, when the read signal is received on line 754 by the second FIFO sub-block 730, the second FIFO sub-block 730 determines whether each of the data locations in the first sub-block 710 have been read. Again, it does this by checking the status of the read-accept signal on line 732 received from the first FIFO sub-block 710. If all of the data in FIFO sub-block 710 has been read, data is read from the FIFO sub-block 730. If all of the data has not been read from the FIFO sub-block 710, the read signal is passed on line 734 to the first FIFO sub-block 710.

In this way, data is first read from the first memory location 720 then the second memory location 722 in the first FIFO memory sub-block 710. Following that, data is read from the third memory location 740 then the fourth memory location 742 in the second FIFO sub-block 730. Next, data is read from the fifth memory location 716 then the sixth memory location 762 in the third FIFO sub-block 750. Once data has been read from the sixth memory location 762 in the third FIFO sub-block 750, the cycle repeats and data is read from the first memory location 720 in the first FIFO sub-block 710. At this time the read accept signal is asserted by the last FIFO sub-block 750, which sets the other FIFO sub-blocks into the read accept mode once again.

When data is read from the first FIFO sub-block 710, it is output on lines 736 to the second FIFO sub-block 730. This data, or data read from the second FIFO sub-block is provided to the third FIFO sub-block 750 on lines 756. The third FIFO sub-block 750 provides the data as an output of the FIFO 700 on line 714.

Before data is read from the FIFO, a check is done to ensure that the FIFO is not empty. In this example, local empty signals are combined to generate an empty signal for the entire FIFO. Specifically, local empty signals on lines 791, 792, and 793 are combined by logic gate 790 to generate an empty signal on line 718.

Figure 8A:
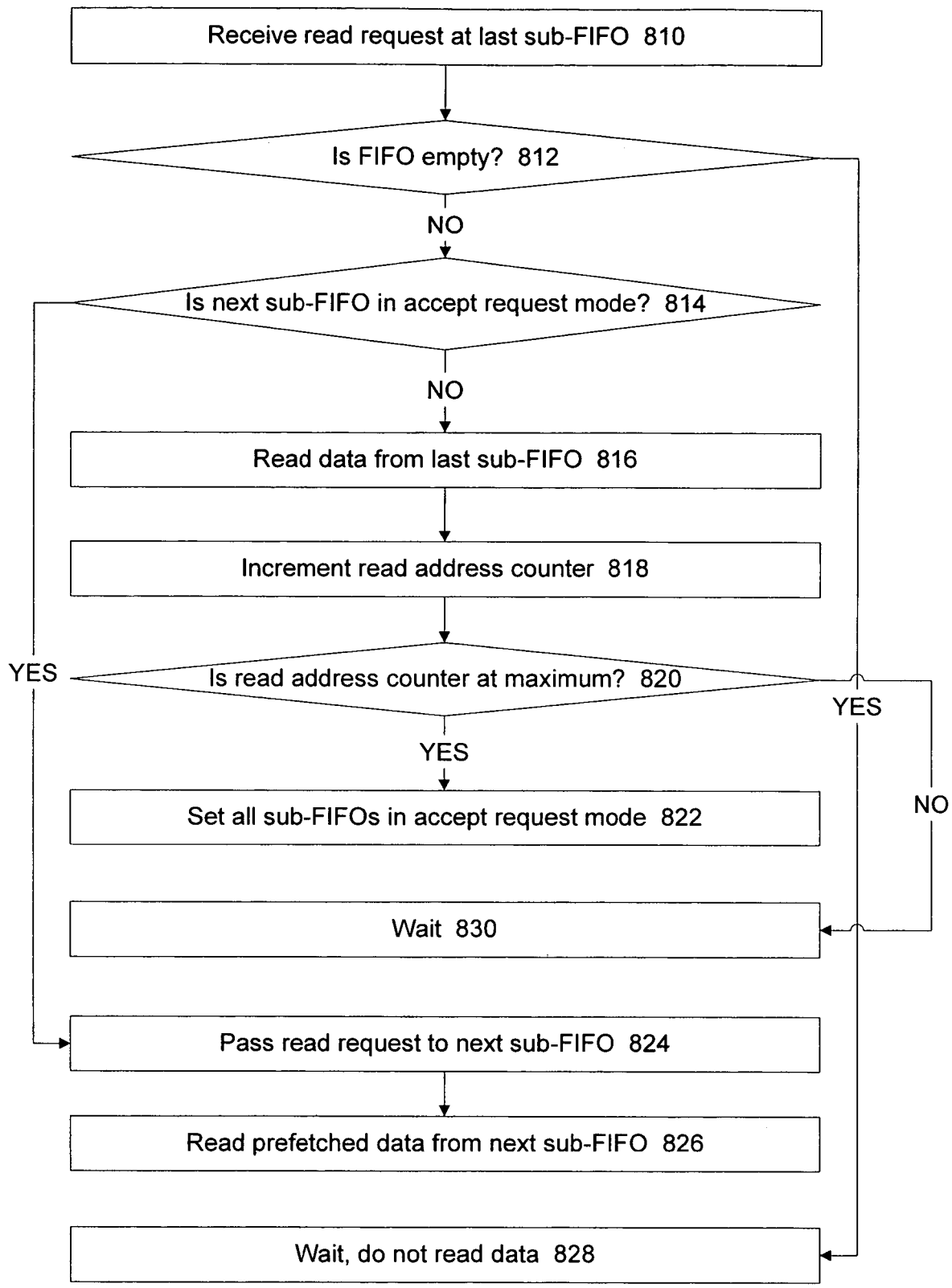
FIGS. 8A-C are flowcharts illustrating the operation of a read path for a last, middle, and first sub-block of a distributed FIFO according to an embodiment of the present invention.
Figure 8B:
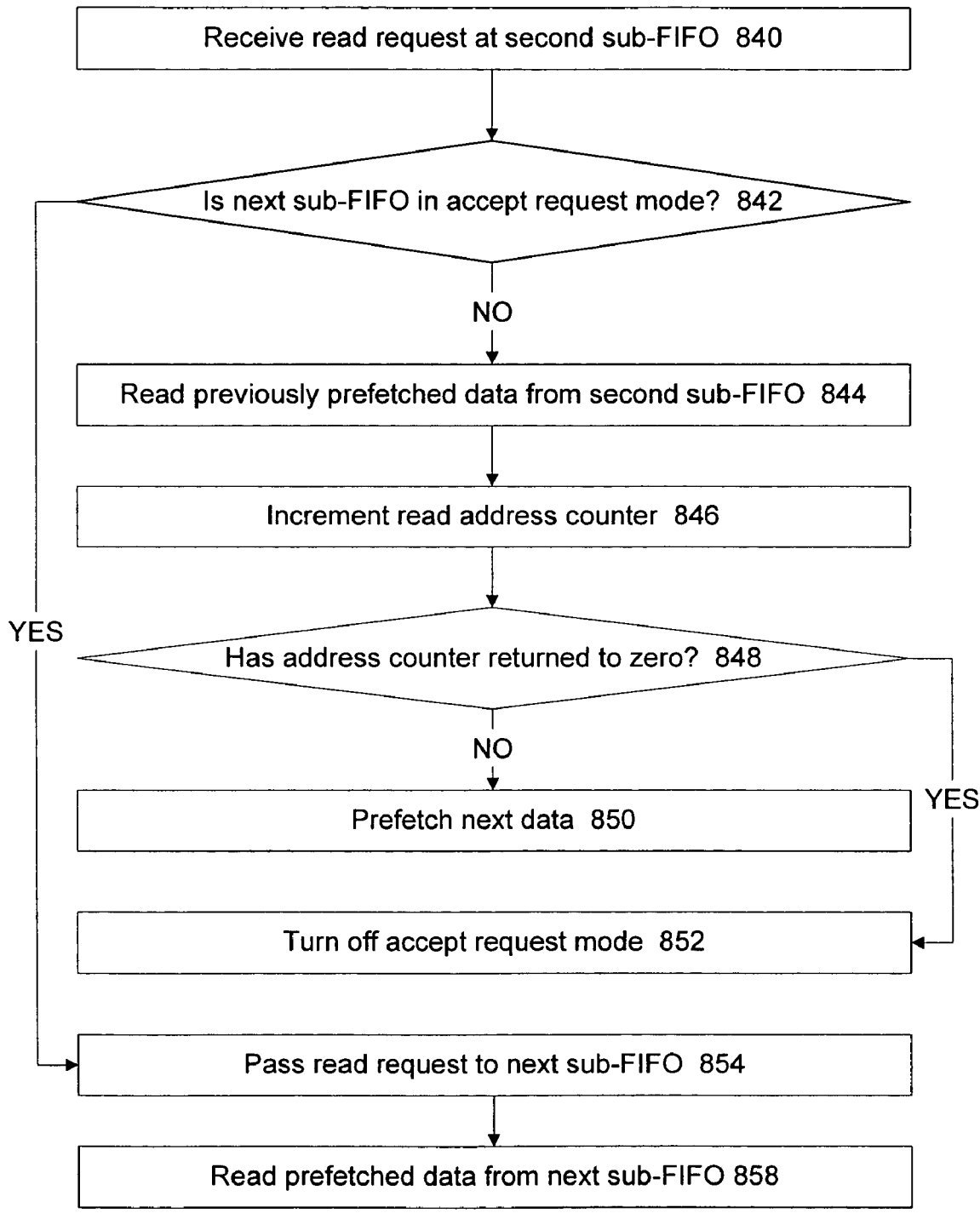
Figure 8C:
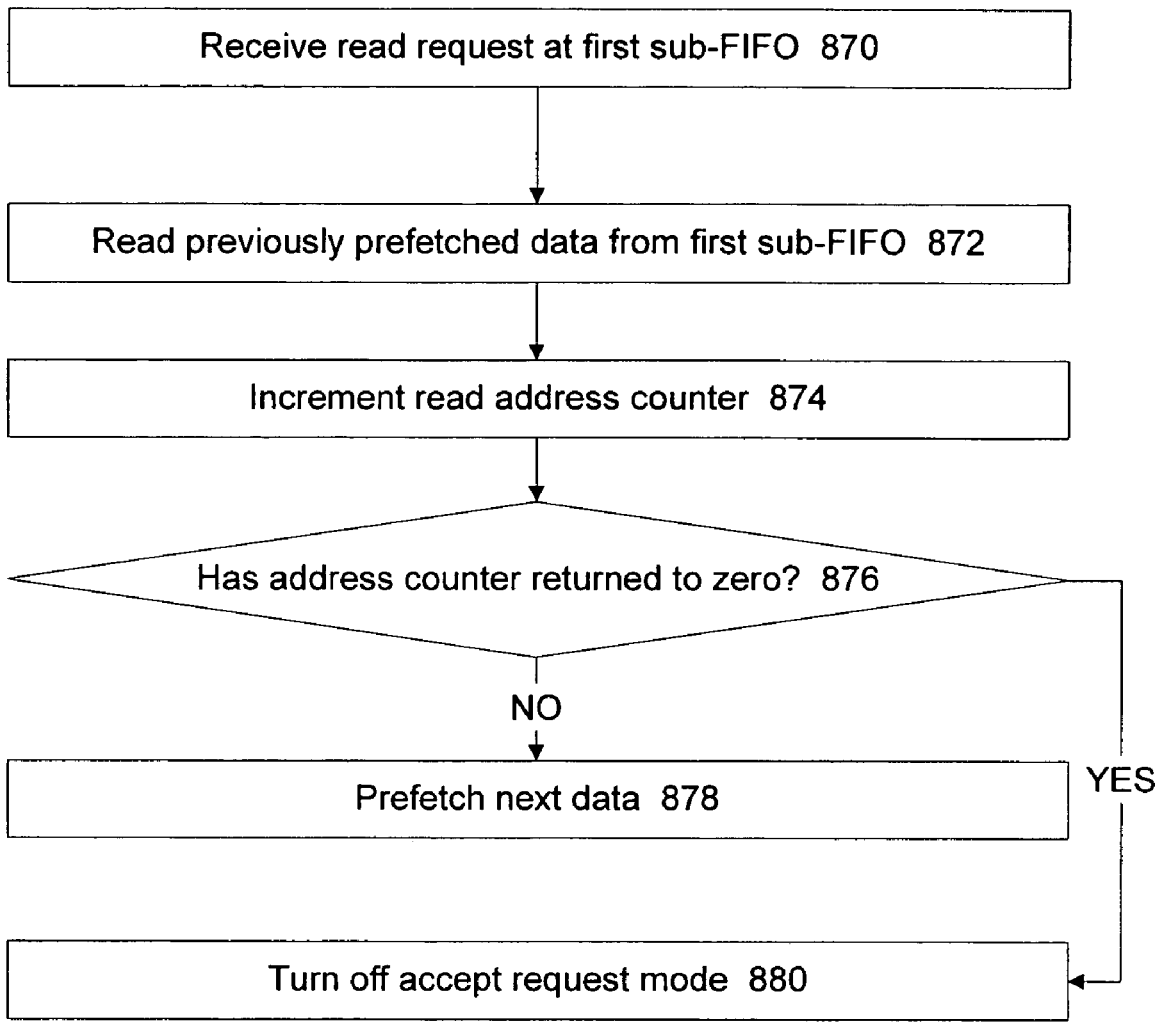

FIGS. 8A-C are flowcharts illustrating the operation of a read path for a last, middle, and first sub-block of a distributed FIFO according to an embodiment of the present invention. FIG. 8A is a flowchart illustrating the operation of a read path for a last or final FIFO sub-block according to an embodiment of the present invention. In act 810, a read command is provided to the last FIFO sub-block. In act 812, it is determined whether the FIFO is empty. If the FIFO is empty, then data is not read from the FIFO, as shown in act 828.

If the FIFO is not empty, it is determined whether the next FIFO sub-block is accepting read requests in act 814. If the next FIFO sub-block is accepting read requests, the read request is passed to the next FIFO sub-block in act 824, and data is prefetched from the next FIFO sub-block in act 826.

If the next FIFO sub-block is not accepting requests, data is read from the last FIFO sub-block in act 816. In act 818, the read address counter is incremented. In act 820, it is determined whether the read address counter has reached its maximum, and if so, it is known that the last location in the last FIFO sub-block has been read. If it has, the next read is from the first location in the first FIFO sub-block and accordingly all FIFO sub-blocks are placed in the accepting request mode in act 822. If it has not, the FIFO sub-block waits in act 830.

FIG. 8B is a flowchart illustrating the operation of a read path for a middle FIFO sub-block according to an embodiment of the present invention. Again, a middle FIFO sub-block is a FIFO sub-block that is neither the first nor the last FIFO sub-block. In act 840, a read request is received at the second or middle FIFO sub-block. In act 842, it is determined whether the next FIFO sub-block is accepting requests. If it is, the read request is passed to the next FIFO sub-block in act 854, and prefetched data is read from the next to frontal sub-block in act 858.

If the next FIFO sub-block is not accepting requests, then data from the second FIFO sub-block is provided in act 844, and the read address counter is incremented in act 846. The data provided in act 844 is typically prefetched to avoid delays in the read path through the FIFO circuit. In act 848, it is determined whether the counter has returned to zero, or reached its maximum count, depending on the exact implementation used. If it has, then the accept request mode is turned off in act 852. If it has not reached this value, the next data is prefetched in act 850.

FIG. 8C is a flowchart illustrating the operation of a read path for a first FIFO sub-block according to an embodiment of the present invention. A read request is received at the first FIFO sub-block in act 870. Previously prefetched data is read from the first FIFO sub-block in act 872, and the read address counter is incremented in act 874. In act 876, it is determined whether the address counter has returned to zero, or reached its maximum count, depending on the exact implementation used. If it has, the accept request mode is turned off in act 880. If the address counter has not reached this value, the next data is prefetched in act 878.

Figure 9:
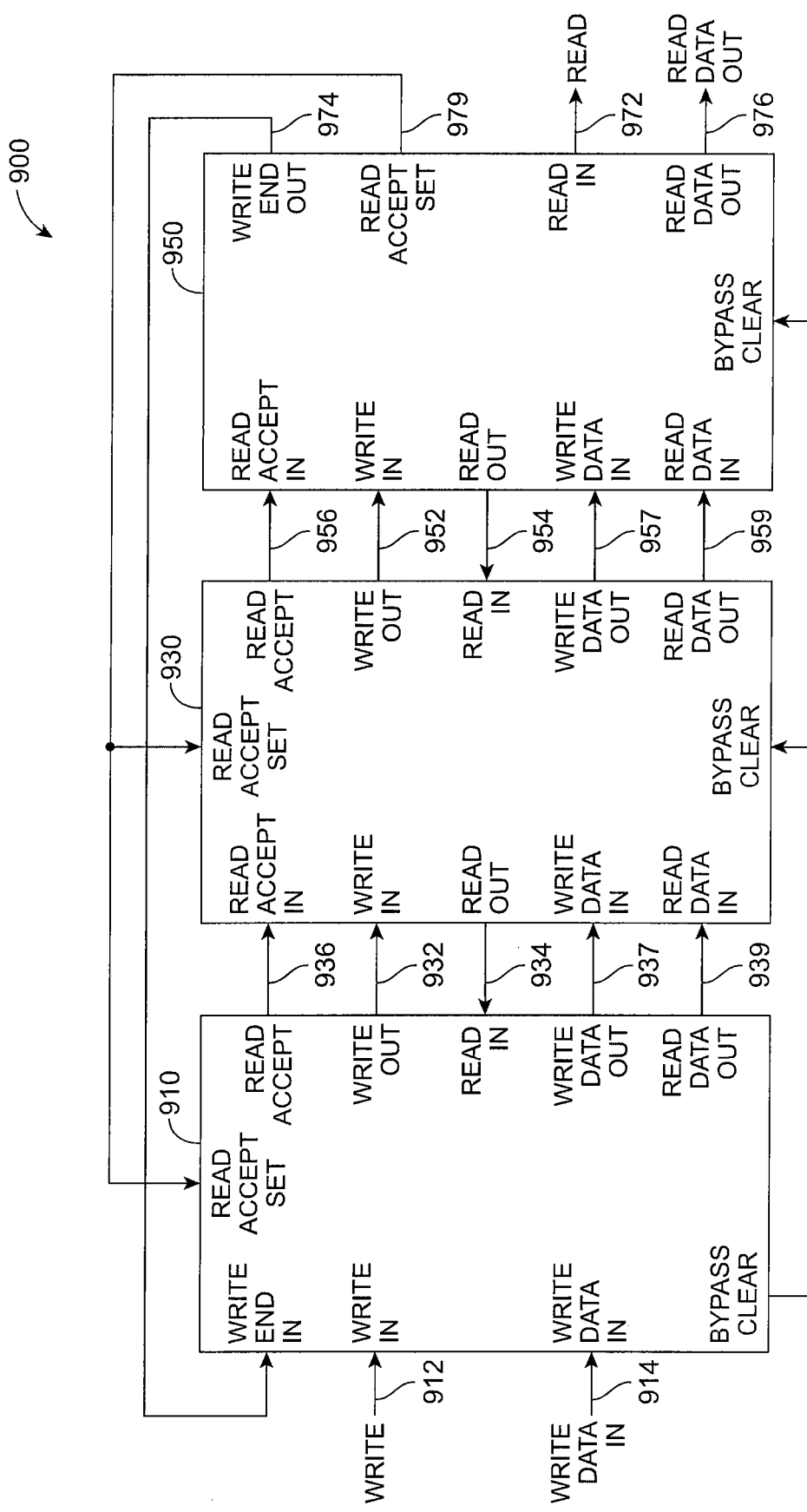
FIG. 9 is a block diagram of a distributed FIFO according to an embodiment of the present invention.

FIG. 9 is a block diagram of a distributed FIFO according to an embodiment of the present invention. As before, this circuit includes three FIFO sub-blocks, in this case FIFO sub-blocks 910, 930, and 950, though other embodiments may include different numbers of blocks, such as two, four, or more blocks. In this figure, both the read and write paths are shown.

A write signal is received by the first FIFO sub-block 910 on line 912 and as necessary is passed to the second FIFO sub-block 930 on line 932, and to the third FIFO sub-block 950 on line 952. Similarly, a read signal is received by the third FIFO sub-block 950 on line 972, and is passed as necessary to the second FIFO sub-block 930 on line 954 and to the first FIFO sub-block on line 934.

Read-accept signals are provided by the first FIFO sub-block 910 on line 936 and by the second FIFO sub-block 930 on line 956. A write-end signal is provided by the third FIFO sub-block 950 on line 974 to the first FIFO sub-block 910. Write data is provided on lines 914 to the FIFO 910, and passed as necessary on lines 937 to the second FIFO sub-block 930 and on lines 957 to the third FIFO sub-block 950, while data is read out on lines 976. A read accept set signal on line 979 is generated by the FIFO sub-block 950 and received by sub-blocks 910 and 930. A bypass clear signal on line 978 is generated by the FIFO sub-block 910 and received by FIFO sub-blocks 930 and 950. Full and empty signals are not shown for clarity, but may be generated as shown in FIGS. 5 and 7.

FIGS. 10A-C illustrate normal, empty, and full states for a distributed FIFO according to an embodiment of the present invention. FIG. 10A illustrates a "normal," that is, neither full nor empty state for a FIFO. This figure includes FIFO sub-blocks 1010, 1020, and 1030, write pointer 1016, and read pointer 1018. The first FIFO sub-block 1010 includes memory storage locations 1012 and 1014, the second or middle FIFO sub-block 1020 includes storage locations 1022 and 1024, while the last or final FIFO sub-block 1030 includes memory locations 1032 and 1034.

In these examples, an "O" indicates a memory location that either has not been written two, or has been written to and read from, while an "X" indicates a memory locations that has been written to but not read from. The write pointer 1016 indicates the next memory location that is to been written to, while the read pointer 1018 indicates the next memory locations that is to be read from. Typically, a FIFO is designed to be deep enough such that it does not fill, or only fills on rare occasions. Typically, a full state prevents data from been written to the FIFO. This is undesirable in that it can stall up-stream circuitry.

FIG. 10B illustrates a "full" state for a FIFO. This figure includes FIFO sub-blocks 1040, 1050, and 1060, write pointer 1046, and read pointer 1048. The first FIFO sub-block 1040 includes memory storage locations 1042 and 1044, the second or middle FIFO sub-block 1050 includes storage locations 1052 and 1054, while the last or final FIFO sub-block 1060 includes memory locations 1062 and 1064. As can be seen, the write pointer 1046 has reached the read pointer 1048. There are no memory locations that can be written to without overwriting data that has not been read. Once a read operation occurs, the read pointer will move to memory location 1062, and data may be written to memory location 1054.

It should be noted that in typical embodiments of the present invention there is not a read and write pointer as such. Rather, if FIFO sub-block 1040 is in the write bypass mode and the write counter in the FIFO sub-block pointing to location 1054, the next write will be to that location. Similarly, if FIFO sub-block 1040 is not accepting read requests and the read counter in the FIFO sub-block pointing to location 1054, the next read will be from that location.

Just as it is undesirable for a FIFO to fill, an empty FIFO can stall downstream processing and is also undesirable. FIG. 10C illustrates an "empty" state for a FIFO. This figure includes FIFO sub-blocks 1070, 1080, and 1090, write pointer 1076, and read pointer 1078. The first FIFO sub-block 1070 includes memory storage locations 1072 and 1074, the second or middle FIFO sub-block 1080 includes storage locations 1082 and 1084, while the last or final FIFO sub-block 1090 includes memory locations 1092 and 1094. As can be seen, the write pointer 1076 has been caught by the read pointer 1078. There are no memory locations that can be read from. Once a write operation occurs, the write pointer will move to memory location 1092, and data may be read to memory location 1092.

There are several ways that the FIFO circuitry can be arranged to detect a full or empty state. Typically, a comparison between a read counter and write counter is involved. For example, in one embodiment of the present invention, a write counter in the first FIFO sub-block is large enough to count every write command, while a read counter in the last FIFO sub-block counts every read request. This configuration has a certain appeal since the first FIFO sub-block receives every write command, while the last FIFO sub-block receives every read request. These two counters also have an extra most-significant bit (MSB). When the counts match, the FIFO is either full or empty. If the extra bits match, it can be determined that the FIFO is empty, if the extra bits do not match, the FIFO is full.

One downside of this method is that counter information from the last FIFO sub-block must be shared with the first FIFO sub-block. This means lines must be routed between these blocks, consuming valuable interconnect resources. Thus, another embodiment of the present invention passes each read request received by the last FIFO sub-block to the first FIFO sub-block. As before, the write counter in the first FIFO sub-clock is large enough to count each write received by the FIFO, while the read counter in the first FIFO sub-block is made large enough to count each read. Again, an extra MSB is included, and a comparison is made as before.

In yet another embodiment of the present invention, each read and write counter in each FIFO sub-block has an extra MSB. If the counts for the read and write counter in each FIFO sub-block match each other, the FIFO may be either full or empty. (That is, if the counts in any one FIFO sub-block mismatch, the FIFO is not either full or empty.) If the counts in each FIFO sub-block match and the MSBs for the read and write counters in each FIFO sub-block also match, the FIFO is empty, while if the counts in each FIFO sub-block match and none of the MSBs for the read and write counters in each FIFO sub-block match, the FIFO is full.

Figure 11A:
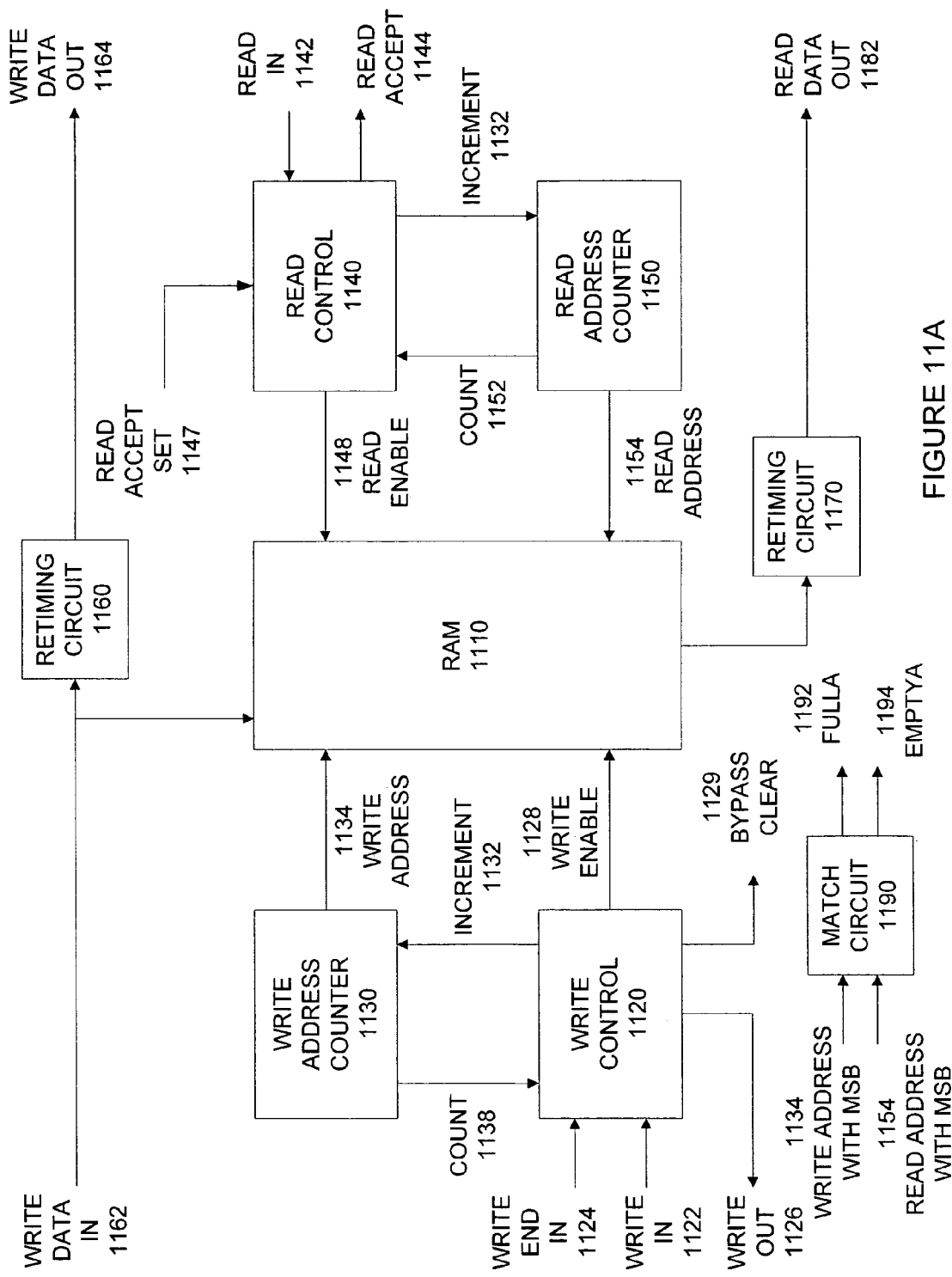
FIGS. 11A-C are block diagrams of FIFO sub-blocks that may be used for the first, middle, and last FIFO sub-blocks of the distributed FIFO of FIG. 9.
Figure 11B:
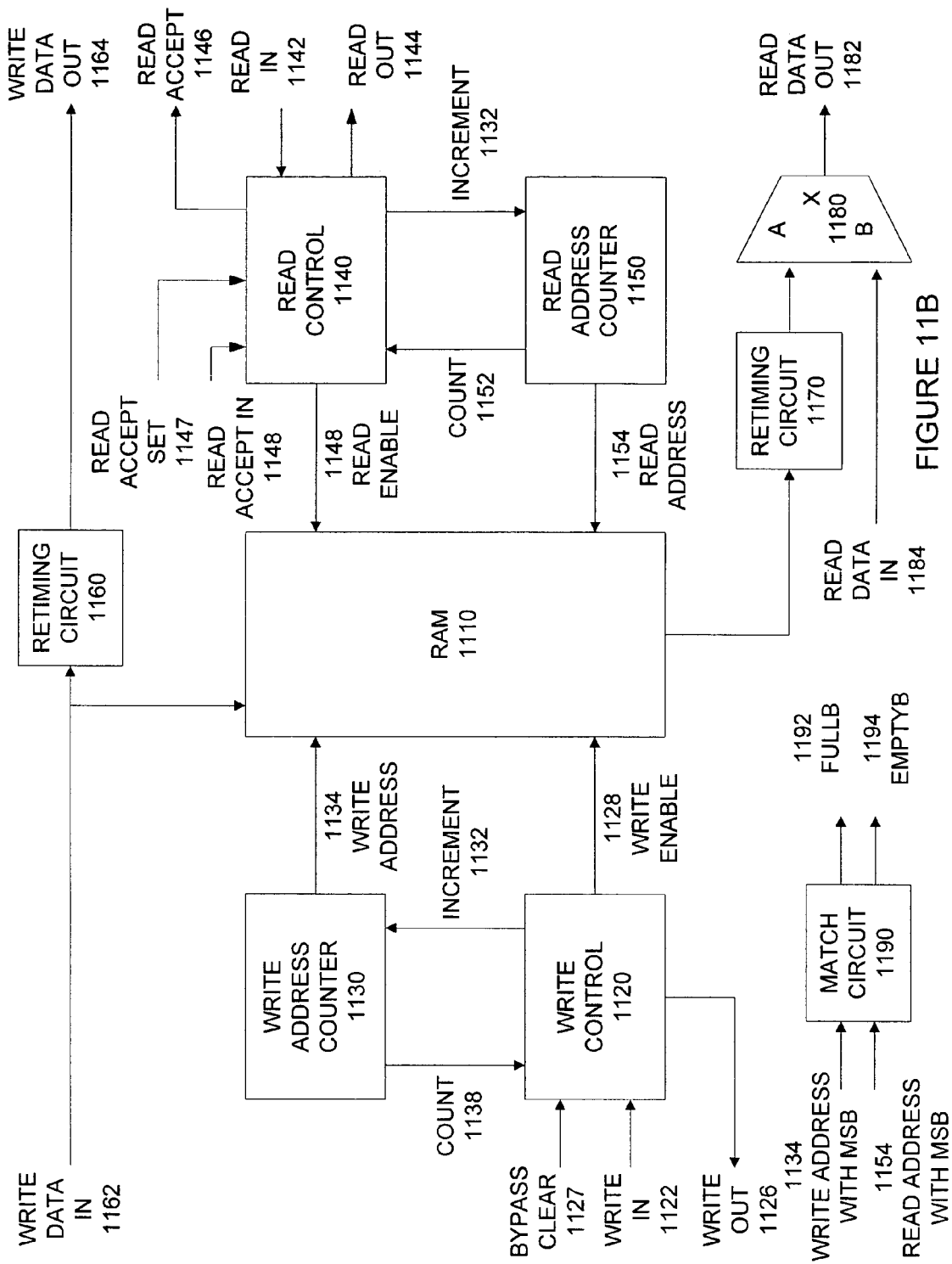
Figure 11C:
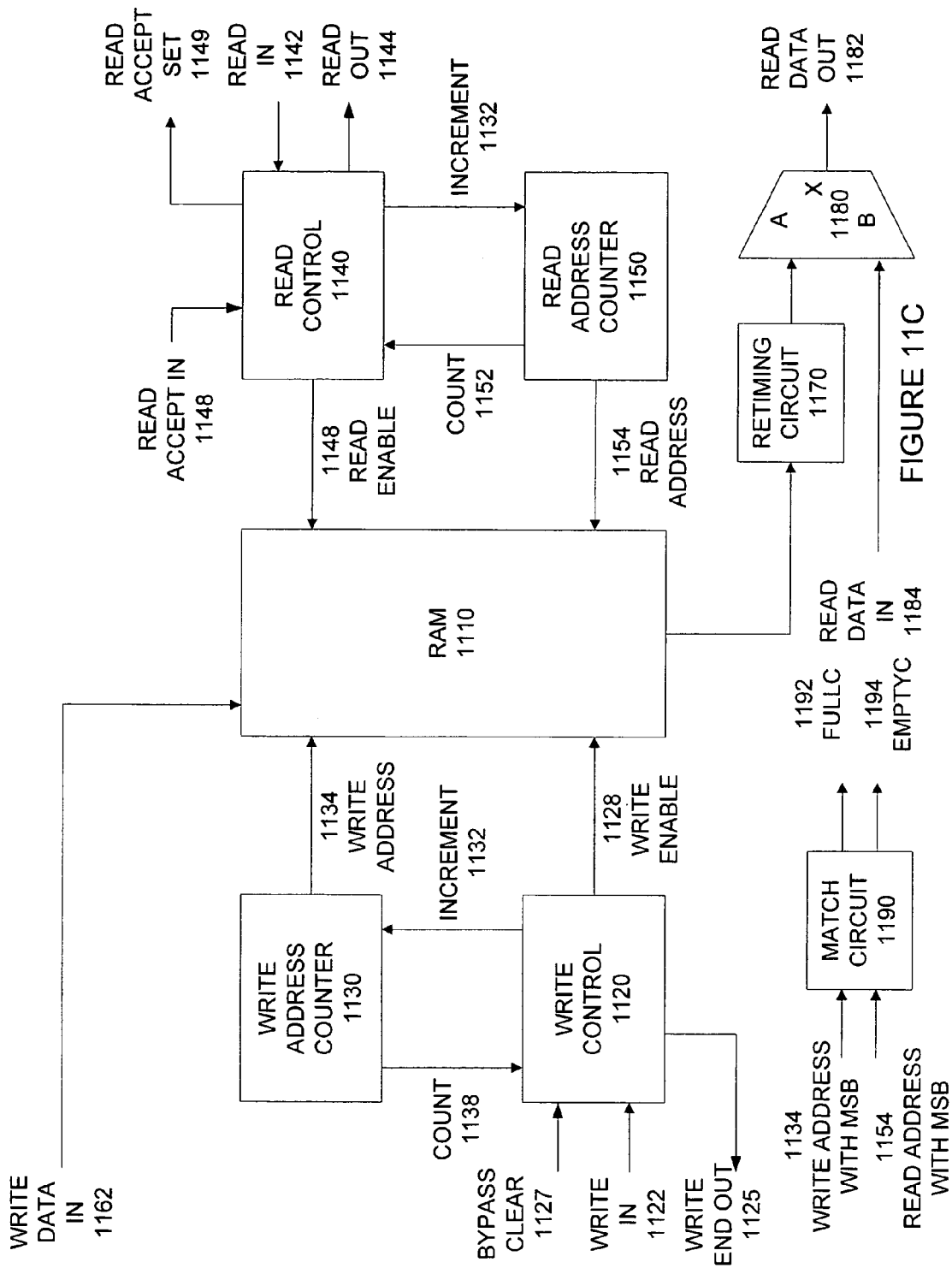

FIGS. 11A-C are block diagrams of FIFO sub-blocks that may be used for the first, middle, and last FIFO sub-blocks of the distributed FIFO of FIG. 9. FIG. 11A is a block diagram of a FIFO sub-block that may be used for the first FIFO sub-block of the distributed FIFO of FIG. 9.

FIG. 11A includes a local memory array 1110, write control circuit 1120, write address counter 1130, read control circuit 1140, read address counter 1150, write path retiming circuit 1160, read path retiming circuit 1170, and match circuit 1190.

Write commands are received on line 1122 by the write control circuit 1120. The write control circuit 1120 controls data writes to the memory array 1110 using a write enable signal on line 1128. Once the write control circuit 1120 has written data to each of the memory storage locations in the local memory 1110, the write control circuit 1120 forwards further write signals to the next FIFO sub-block using the write-out signal on line 1126.

A write-end input signal is received by the write control circuitry 1120 on line 1124 from the last FIFO sub-block (not shown) when the write counter in the last FIFO sub-block has almost reached its maximum count. When the write control circuit 1120 receives the write-end signal and the write address counter 1130 has reach its full count, the write control circuit 1120 begins writing once again to the local memory array 1110 and clears the bypass mode from the subsequent FIFO sub-blocks using the bypass clear signal on line 1129.

The write address counter 1130 receives an increment signal on line 1132 from the write control circuit 1120 and provides an address on lines 1134 to the memory array 1110 and, along with an extra MSB, to the match circuit 1190.

The read control circuit 1140 receives a read request signal on line 1142 and provides a read accept signal on line 1144. The read accept signal on line 1144 remains asserted until all the locations in the local memory array 1110 have been read. After the read accept set signal on line 1147 is received, the read control circuit reasserts the read accept signal on line 1144. The read control circuit 1140 provides an increment signal on line 1148 to the address counter 1150. The address counter 1150 provides read addresses on line 1154 to the local memory array 1110, and along with an MSB, to the match circuit 1190.

Data to be written to the FIFO is received on line 1162 and is forwarded as necessary by the retiming circuit 1160 on line 1164. Data retrieved from the local memory array 1110 is retimed by retiming circuit 1170 which provides an output on line 1182.

In a typical embodiment of the present invention, data from the FIFO sub-blocks is delayed by the retiming circuits 1170. Accordingly, various embodiment of the present invention prefetch data from the local memory arrays 1110 such that this delay is eliminated. Data is prefetched from the storage location identified by the address counter 1150. Specifically, read data is prefetched from the local memory array 1110 and stored in retiming circuit 1170.

The match circuit 1190 generates local full and empty signals. These signals are combined with local full and empty signals from the other FIFO sub-circuits to determine if the entire FIFO circuit is in the full or empty state. The local empty signal, EMPTYA on line 1194, is asserted if each of the address bits, including the MSBs, are a match. The local full signal FULLA on line 1192 is asserted if each of the address bits, excluding the MSBs match, but the MSBs mismatch. If all the local full signals are asserted, the FIFO is full. If all the local empty signals are asserted, the FIFO is empty.

FIG. 11B is a block diagram of a FIFO sub-block that may be used for the middle FIFO sub-block of the distributed FIFO of FIG. 9. Again, a middle FIFO sub-block is a FIFO sub-block that is neither the first nor the last FIFO sub-block in a FIFO. Various embodiments may include zero, one, two, or more middle FIFO sub-blocks. FIG. 11B includes a local memory array 1110, write control circuit 1120, write address counter 1130, read control circuit 1140, read address counter 1150, write path retiming circuit 1160, read path retiming circuit 1170, read multiplexer 1180, and match circuit 1190.

Write commands are received on line 1122 by the write control circuit 1120 from a previous FIFO sub-block (not shown). The write control circuit 1120 controls data writes to the memory array 1110 using a write enable signal on line 1128. Once the write control circuit 1120 has written data to each of the memory storage locations in the local memory 1110, the write control circuit 1120 forwards further write signals to the next FIFO sub-block using the write-out signal on line 1126. After the bypass clear signal is received from the first FIFO sub-block on line 1127, the write control circuit 1120 begins writing to the local memory array 1110 when write in signals are once again received by the sub-block.

The write address counter 1130 receives an increment signal on line 1132 from the write control circuit 1120 and provides an address on lines 1134 to the memory array 1110 and, along with an extra MSB, to the match circuit 1190.

The read control circuit 1140 receives a read request signal on line 1142 from a subsequent FIFO sub-block and a read accept in signal on line 1148 from a previous sub-block, and provides a read accept signal on line 1146 to the subsequent FIFO sub-block and a read out signal to the previous FIFO sub-block on line 1144. If the read accept in signal on line 1148 is asserted, any read in signal on line 1142 is passed to the previous sub-block on line 1146. Once the read accept in signal on line 1146 is deasserted, the read control circuit 1140 will read data from the local memory array 1110. The read accept signal on line 1146 remains asserted until all the locations in the local memory array 1110 have been read. After the read accept set signal on line 1147 is received, the read control circuit reasserts the read accept signal on line 1146.

The read control circuit 1140 provides an increment signal on line 1132 to the address counter 1150. The address counter 1150 provides read addresses on line 1154 to the local memory array 1110, and along with an MSB, to the match circuit 1190.

Data to be written to the FIFO is received on line 1162 and is forwarded as necessary by the retiming circuit 1160 on line 1164. Data retrieved from the local memory array 1110 is retimed by retiming circuit 1170. Data from the previous sub-circuit is also receives by the multiplexer 1180, which provides an output on line 1182.

Again, the match circuit 1190 generates local full and empty signals, which are combined with local full and empty signals from the other FIFO sub-circuits to determine if the entire FIFO circuit is in the full or empty state.

FIG. 11C is a block diagram of a FIFO sub-block that may be used for the last or final FIFO sub-block of the distributed FIFO of FIG. 9. FIG. 11C includes a local memory array 1110, write control circuit 1120, write address counter 1130, read control circuit 1140, read address counter 1150, read path retiming circuit 1170, read multiplexer 1180, and match circuit 1190.

Write commands are received on line 1122 by the write control circuit 1120 from a previous FIFO sub-block (not shown). The write control circuit 1120 controls data writes to the memory array 1110 using a write enable signal on line 1128. Once the write control circuit 1120 has written data to nearly each of the memory storage locations in the local memory 1110 (the number of memory locations less some number "N" as described above), the write control circuit 1120 asserts the write-end out signal on line 1125, which is received by the first FIFO sub-block. After the bypass clear signal is received from the first FIFO sub-block on line 1127, the write control circuit 1120 begins writing to the local memory array 1110 when write in signals are once again received by the sub-block.

The write address counter 1130 receives an increment signal on line 1132 from the write control circuit 1120 and provides an address on lines 1134 to the memory array 1110 and, along with an extra MSB, to the match circuit 1190.

The read control circuit 1140 receives a read request signal on line 1142 and a read accept in signal on line 1148 from a previous sub-block, and provides a read out signal to the previous FIFO sub-block. If the read accept in signal on line 1148 is asserted, any read in signal on line 1142 is passed to the previous sub-block as a read out signal on line 1144. Once the read accept in signal on line 1148 is deasserted, the read control circuit 1140 reads data from the local memory array 1110. After each of the memory locations in the local memory 1110 have been read from, the read control circuit asserts the read accept set signal on line 1149, which sets all the FIFO sub-blocks into the read accept mode once again.

The read control circuit 1140 provides an increment signal on line 1132 to the address counter 1150. The address counter 1150 provides read addresses on line 1154 to the local memory array 1110, and along with an MSB, to the match circuit 1190.

Data to be written to the FIFO is received on line 1162. Data retrieved from the local memory array 1110 is retimed by retiming circuit 1170. Data from the previous sub-circuit is also receives by the multiplexer 1180, which provides an output on line 1182.

Again, the match circuit 1190 generates local full and empty signals, which are combined with local full and empty signals from the other FIFO sub-circuits to determine if the entire FIFO circuit is in the full or empty state.

It will be appreciated by one skilled in the art that many of the implementation details described herein may be modified in implementations of the present invention. For example, several circuits and methods that can be used to determine whether a FIFO is full or empty were described, and others are certainly possible. Also, events have been described as being triggered by a counter reaching a maximum or minimum count. In other embodiments, other counts may be used. Further, a maximum count may be reached by some number of bits of a counter, the number less than a total amount of bits for the counter. For example, for a six bit counter, a "maximum counter" value may be reached when the lower five bits reach "11111" regardless of the state of the MSB. Also, in other embodiments of the present invention, other counts, such as zero or any other value, may be used as a triggering event. Also, by way of example, implementation details regarding state control signals such as the bypass clear and accept set signals were described. It will be appreciated by one skilled in the art that other embodiments of the present invention may use other signals, or these signals may be generated or used in other ways.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of writing to a FIFO comprising a plurality of sub-blocks, the method comprising:
   providing a write command to a first FIFO sub-block, the first FIFO sub-block comprising a first plurality of storage locations;
   providing data to the first FIFO sub-block;
   determining whether each of the first plurality of storage locations in the first FIFO sub-block have been written to, and if not, writing the data to one of the first plurality of storage locations in the first FIFO sub-block, else;
   providing the write command to a second FIFO sub-block, the second FIFO sub-block comprising a second plurality of storage locations; and
   determining whether each of the second plurality of storage locations in the second FIFO sub-block have been written to, and if not, writing the data to one of the second plurality of storage locations in the second FIFO sub-block.

2. The method of claim 1 further comprising:
   if each of the second plurality of storage locations in the second FIFO sub-block have been written to, then
   providing the write command to a last FIFO sub-block, the last FIFO sub-block comprising a third plurality of storage locations;
   writing the data to one of the third plurality of storage locations; and
   determining whether each of the third plurality of storage locations in the last FIFO sub-block have been written to; and if so, sending a signal with a first polarity to the first FIFO sub-block, else sending the signal with a second polarity to the first FIFO sub-block.

3. The method of claim 1 wherein when data is written to one of the first plurality of storage locations in the first FIFO sub-block it is written at a storage location identified by a first write address counter, and when data is written to one of the second plurality of storage locations in the second FIFO sub-block it is written at a storage location identified by a second write address counter.

4. The method of claim 3 wherein the first address counter provides a first write address for the first FIFO sub-block and the first write address is not provided to the second FIFO sub-block.

5. The method of claim 4 wherein the second address counter provides a second write address for the second FIFO sub-block and the second write address is not provided to the first FIFO sub-block.

6. The method of claim 1 wherein when the data is written to the second FIFO sub-block, the data is received by the first FIFO sub-block, retimed, and provided to the second FIFO sub-block.

7. The method of claim 1 wherein the first FIFO sub-block and the second FIFO sub-block are formed on a field programmable gate array.

8. A method of reading data from a FIFO comprising a plurality of sub-blocks, the method comprising:
   providing a read command to a first FIFO sub-block, the first FIFO sub-block comprising a first plurality of storage locations;
   determining whether data has been read from each of a second plurality of storage locations in a second FIFO sub-block, and if it has, then reading data from one of the first plurality of storage locations in the first FIFO sub-block, else,
   providing the read command to the second FIFO sub-block; and
   determining whether data has been read from each of a third plurality of storage locations in a third FIFO sub-block, and if it has, then reading data from one of the second plurality of storage locations in the second FIFO sub-block.

9. The method of claim 8 further comprising:
   when reading data from the second FIFO sub-block, retiming the data and providing the retimed data to the first FIFO sub-block.

10. The method of claim 8 further comprising:
   before reading data from the second FIFO sub-block, prefetching the data from the second FIFO sub-block.

11. The method of claim 8 wherein when data is read from one of the first plurality of storage locations in the first FIFO sub-block it is read from a storage location identified by a first read address counter, and when data is read from one of the second plurality of storage locations in the second FIFO sub-block it is read from a storage location identified by a second read address counter.

12. The method of claim 11 wherein the first address counter provides a first read address for the first FIFO sub-block and the first read address is not provided to the second FIFO sub-block.

13. The method of claim 12 wherein the second address counter provides a second read address for the first FIFO sub-block and the second read address is not provided to the first FIFO sub-block.

14. The method of claim 8 wherein the first FIFO sub-block, the second FIFO sub-block, and the third FIFO sub-block are formed on a field programmable gate array.

15. An integrated circuit comprising a FIFO, the FIFO comprising:
   a first FIFO sub-block comprising:
      a first read address counter configured to provide a first read address;
      a first write address counter configured to provide a first write address;
      a first memory array; and
      write circuitry to receive a write signal and write data, to write the write data to the first memory array when the first write address counter is not at a first count, and to pass the write signal and write data to a second FIFO sub-block when the first write address counter is at the first count; and
   the second FIFO sub-block comprising:
      a second read address counter configured to provide a second read address;
      a second write address counter configured to provide a second write address;
      a second memory array; and
      write circuitry to receive the write signal and write data from the first FIFO sub-block.

16. The integrated circuit of claim 15 wherein the second FIFO sub-block further comprises read circuitry to receive a read signal and provide read data.

17. The integrated circuit of claim 16 wherein the second FIFO sub-block further comprises a multiplexer coupled to receive data from the first memory array and the second memory array.

18. The integrated circuit of claim 17 wherein the first memory array and the second memory array are two port SRAMs.

19. The integrated circuit of claim 16 wherein the first read address and the first write address are not provided to the second FIFO sub-block and the second read address and the second write address are not provided to the first FIFO sub-block.

20. The integrated circuit of claim 19 wherein the integrated circuit is a field programmable gate array.

* * * * *